United States Patent [19]

Suzuki et al.

[11] Patent Number: 5,258,438
[45] Date of Patent: Nov. 2, 1993

[54] FLAME RETARDANT RESIN COMPOSITION BASED ON BROMOSTYRENE-CONTAINING POLYMERS

[75] Inventors: Masanori Suzuki; Hiroyuki Itoh; Seiichi Atomori; Tateki Furuyama, all of Yokkaichi mie, Japan

[73] Assignee: DSM N.V., Netherlands

[21] Appl. No.: 728,687

[22] Filed: Jul. 12, 1991

[51] Int. Cl.$^5$ .................. C08J 5/10; C08K 3/10; C08L 35/06

[52] U.S. Cl. ..................... 524/409; 524/411; 524/412

[58] Field of Search ........... 524/409, 411, 412, 494, 524/495

[56] References Cited

U.S. PATENT DOCUMENTS 4,329,272 5/1982 Dufour ........................... 524/288

FOREIGN PATENT DOCUMENTS 1149984 12/1983 Canada .

OTHER PUBLICATIONS

Chemical Abstracts, vol. 93, No. 4, Abstract No. 27250P.
Chemical Abstracts, vol. 94, No. 12, Abstract No. 85128M.
World Patents Index Latest, AN 91-215653.

*Primary Examiner*—Paul R. Michl
*Assistant Examiner*—U. K. Rajguru
*Attorney, Agent, or Firm*—Cushman, Darby & Cushman

[57] ABSTRACT

A flame retardant resin composition including the following components (A), (B) and (C) in the ratio (A):(B):(C)=15-99:0-84:1-30% by weight; and wherein the molar ratio of bromine atom and antimony atom is 1.2-4.5:1. Component (A) is a rubber reinforced resin composition including 10-100% by weight of graft copolymer (A-1) which is obtained by the polymerization of (b) 90-30% by weight of monomer components including 5-50% by weight of bromostyrene and 95-50% by weight of one or more monomers selected from the group consisting of aromatic vinyl monomers, cyanated vinyl monomers, (meth)acrylic acid ester monomers, maleic anhydride, and maleimide monomers in the presence of (a) 10-70% by weight of a rubber-like polymer [(a)+(b)=100% by weight] and 90-0% by weight of copolymer (A-2) obtained by the polymerization of 60-90% by weight of aromatic vinyl monomers and 40-10% by weight of one or more monomers selected from the group consisting of cyanated vinyl monomers, (meth)acrylic acid ester monomers, maleic anhydride, and maleimide monomers. Component B is a bromine-containing copolymer obtained by the polymerization of 5-50% by weight of bromostyrene and 95-50% by weight of one or more monomers selected from the group consisting of aromatic vinyl monomers, cyanated vinyl monomers, (meth)acrylic acid ester monomers, maleic anhydride, and maleimide monomers. Component (C) is an antimony oxide.

1 Claim, No Drawings

FLAME RETARDANT RESIN COMPOSITION BASED ON BROMOSTYRENE-CONTAINING POLYMERS

DETAILED DESCRIPTION OF THE INVENTION

A. Field of the Invention

The present invention relates to a flame retardant resin composition with superior impact resistance and self-fire-extinguishing characteristics.

B. Prior Art

Conventionally, thermoplastic resins which provide impact resistance by means of a rubber-like polymer are commonly known under the general term of ABS resins. However, flame retardant characteristics are necessary depending on the application. This particularly applies to the case where these resins are used as a material for household products, electrical appliances, OA equipment, automobiles, and the like, and as construction materials.

Commonly known methods of imparting flame retardant characteristics to rubber-reinforced thermoplastic resins, including ABS resins, involve blending a flame retarder into the composition, but in many cases this type of flame retarder contains a brominated diphenyl oxide compound or brominated polycarbonate compound. These flame retarders when blended together with antimony trioxide provide a superior flame retarding effect.

However, a difficulty is encountered with respect to the amount to be incorporated these flame retarders in a resin composition. There are also restrictions as to the method of incorporation of these compounds. Furthermore, a resin composition containing a brominated flame retarder has inferior processability. In particular, release of flame retardants or their decomposed products poses problems such as unpleasant odor, generation of hazardous compounds, pollution of molding dies, and the like.

Another problem is that incorporation of a large amount of such a flame retardant in order to achieve a high level of flame retardance of the composition involves generation of a large amount of toxic materials, such as dioxins and furans, during the molding process and during combustion.

As a method of eliminating these drawbacks, proposals have been made that, in place of halogen-containing compounds, compounds containing -phosphorus and-/or nitrogen be added to resin materials.

These additives do not significantly affect the processability of the resin, but still have problems of generation of toxic compounds as a result of decomposition.

PROBLEMS TO BE SOLVED BY THE INVENTION

Accordingly, an object of the present invention is to provide a flame retardant composition with a high level of flame retardance at a low content of a bromine-containing compound and having excellent impact resistance and processability, free from generation of toxic compounds due to the release of a flame retarder or its decomposed products; by copolymerizing bromostyrene into a rubber reinforced thermoplastic resin by means of a special polymerization method and further by adding a specific amount of antimony oxide.

MEANS FOR THE SOLUTION OF THE PROBLEMS

This object is achieved in the present invention by the provision of a flame retardant resin composition comprising the following components (A), (B) and (C) in the ratio (A):(B):(C)=15–99:0–84:1–30% by weight; and wherein the molar ratio of bromine atom and antimony atom is 1.2–4.5:1;

Component (A): a rubber reinforced resin composition comprising: 10–100% by weight of graft copolymer (A-1) which is obtained by the polymerization of (b) 90–30% by weight of monomer components comprising 5–50% by weight of bromostyrene and 95–50% by weight of one or more monomers selected from the group consisting of aromatic vinyl monomers, cyanated vinyl monomers, (meth)acrylic acid ester monomers, maleic anhydride, and maleimide monomers in the presence of (a) 10–70% by weight of a rubber-like polymer [(a)+(b)=100% by weight] and 90–0% by weight of copolymer (A-2) obtained by the polymerization of 60–90% by weight of aromatic vinyl monomers and 40–10% by weight of one or more monomers selected from the group consisting of cyanated vinyl monomers, (meth)acrylic acid ester monomers, maleic anhydride, and maleimide monomers; and Component (B): a bromine-containing copolymer obtained by the polymerization of 5–50% by weight of bromostyrene and 95–50% by weight of one or more monomers selected from the group consisting of aromatic vinyl monomers, cyanated vinyl monomers, (meth)acrylic acid ester monomers, maleic anhydride, and maleimide monomers, and Component (C): an antimony oxide.

The present invention is hereinafter illustrated in more detail.

Component (A) of the present invention is a rubber reinforced resin composition comprising:

10–100% by weight of graft copolymer (A-1) which is obtained by the polymerization of (b) 90–30% by weight of monomer components comprising 5–50% by weight of bromostyrene and 95–50% by weight of one or more monomers selected from the group consisting of aromatic vinyl monomers, cyanated vinyl monomers, (meth)acrylic acid ester monomers, maleic anhydride, and maleimide monomers in the presence of (a) 10–70% by weight of a rubber-like polymer [(a)+(b)=100% by weight] and 90–0% by weight of copolymer (A-2) obtained by the polymerization of 60–90% by weight of aromatic vinyl monomers and 40–10% by weight of one or more monomers selected from the group consisting of cyanated vinyl monomers, (meth)acrylic acid ester monomers, maleic anhydride, and maleimide monomers.

Examples which can be given of the rubber-like polymer include polybutadiene, butadiene-styrene copolymers, polyisoprene, butadiene-acrylonitrile copolymers, ethylene-propylene (diene methylene) copolymers, isobutylene-isoprene copolymers, acrylic rubber, styrene-butadiene block copolymers, styrene-butadiene-styrene block copolymers, styrene-butadiene-styrene radial teleblock copolymers, styrene-isoprene-styrene block copolymers, hydrogenated diene-type (block) copolymers such as SEBS and the like, polyurethane rubber, silicone rubber, and the like. Among these, preferable are polybutadiene, butadiene-styrene copolymers, ethylene-propylene (diene methylene) copolymers, and silicone rubber.

Given as examples of bromostyrenes are monobromostyrenes, dibromostyrenes, and tribromostyrenes, with dibromostyrenes being most preferable.

Examples of aromatic vinyl monomers include styrene, α-methylstyrene, o-methylstyrene, p-methylstyrene, m-methylstyrene, chlorostyrene, dichlorostyrene, α-ethylstyrene, methyl-α-methylstyrene, dimethylstyrene, and the like. Among these, styrene, α-methylstyrene, and p-methylstyrene are preferable.

Examples of cyanated vinyl monomers include acrylonitrile, methacrylonitrile, and the like. Of these, acrylonitrile is preferable.

Examples of (meth)acrylic acid esters which can be given are methyl acrylate, ethyl acrylate, butyl acrylate, methyl methacrylate, ethyl methacrylate, butyl methacrylate, and the like, with methyl methacrylate being the most preferable.

Examples which can be given of maleimide-type monomers include maleimide, N-methyl maleimide, N-ethyl maleimide, N-propyl maleimide, N-isopropyl maleimide, N-cyclohexyl maleimide, N-phenyl maleimide, N-(p-bromophenyl) maleimide, tribromophenyl maleimide, N-(p-chlorophenyl) maleimide, and the like. Among these, the preferable examples are maleimide, N-phenyl maleimide, N-cyclohexyl maleimide, tribromophenyl maleimide, and the like.

An amount of rubber-like polymer (a) to be incorporated in graft copolymer (A-1) is 10–70% by weight, preferably 12–60% by weight, and more preferably 15–50% by weight. If the amount of the rubber-like polymer (a) is less than 10% by weight, the resulting resin composition has a low impact resistance; if more than 70% by weight, the graft ratio decreases, resulting in inferior glossiness of the resin surface and reduced flame retardance.

The graft ratio of the graft copolymer (A-1) is 10–150% by weight and preferably 20–120% by weight. A low graft ratio decreases the impact resistance, while a high graft ratio is cause of dripping due to remelting during combustion.

An amount of bromostyrene to be incorporated in graft copolymer (A-1) is 5–50% by weight, and preferably 5–40% by weight. If the amount of bromostyrene is less than 5% by weight, a sufficient flame retardant effect cannot be obtained; if more than 50% by weight, the resulting resin composition has a low impact resistance.

An amount of aromatic vinyl monomers to be incorporated in graft copolymer (A-2) is 60–90% by weight, and preferably 65–85% by weight. If the amount of aromatic vinyl monomers is less than 60% by weight, the moldability of the resulting resin composition is not good; if more than 90% by weight, the products produced from the resin composition has a poor outward appearance.

An amount of one or more monomers selected from the group consisting of cyanated vinyl monomers, (meth)acrylic acid ester monomers, maleic anhydride, and maleimide monomers to be incorporated in graft copolymer (A-2) is 40–10% by weight. If the amount of these monomers is more than 40% by weight, the moldability and color of the resulting resin composition is not good; if less than 10% by weight, chemical resistance of the resulting resin and the outward appearance of the products produced therefrom is inferior.

A typical composition of component (A) is a rubber-reinforced resin composition comprising ABS resin into which dibromostyrene is grafted and acrylonitrile-styrene copolymer.

The limiting viscosity [η] of the matrix resin of component (A) is preferably 0.1–1.5 dl/gm (this and subsequent values are measured at 30° C. in methyl ethyl ketone), and more preferably 0.3–1.0 dl/gm. If [η] is less than 0.1 dl/gm, the impact strength is inadequate; if greater than 1.5 dl/gm, the moldability of the composition diminishes. The matrix resin is here defined as the resin components in the rubber reinforced resin composition other than the grafted rubber component. The limiting viscosity [η] is the value obtained by measuring the fraction of the rubber reinforced resin composition soluble in methyl ethyl ketone by the conventional manner.

An amount of graft copolymer (A-1) to be incorporated in rubber-reinforced resin composition (A) is 10–100% by weight, and preferably 30–100% by weight. If the amount of graft copolymer (A-1) is less than 10% by weight, the impact resistance can not be exhibited.

The above-mentioned copolymer (B) is a bromine-containing copolymer obtained by the polymerization of 5–50% by weight of bromostyrene and 95–50% by weight of one or more monomers selected from the group consisting of aromatic vinyl monomers, cyanated- vinyl monomers, (meth)acrylic acid ester monomers, maleic anhydride, and maleimide monomers.

The same aromatic vinyl monomers, cyanated vinyl monomers, (meth)acrylic acid ester monomers, maleic anhydride, and maleimide monomers as mentioned for graft copolymer (A) can be used as monomers for copolymer (B).

A typical bromine-containing copolymer is dibromostyrene-acrylonitrile-styrene three-component copolymer.

An amount of bromostyrene to be incorporated in bromine-containing copolymer (B) is 5–50% by weight, and preferably 10–40% by weight. If the amount of bromostyrene is less than 5% by weight, the flame retardance is impaired; if more than 50% by weight, the impact resistance is reduced.

The limiting viscosity [η] of the bromine-containing copolymer (B) is preferably 0.1–1.5 dl/gm, and more preferably 0.3–1.0 dl/gm. If [η] is less than 0.1 dl/gm, the impact strength is inadequate; if greater than 1.5 dl/gm, the moldability of the composition diminishes.

A preferable method of polymerization to prepare bromine-containing copolymer (B) to initiate an emulsion polymerization reaction with 0–40% by weight of a monomer mixture consisting of 5–50% by weight of bromostyrene and 95–50% by weight of one or more monomers selected from the group consisting of aromatic vinyl monomers, cyanated vinyl monomers, (meth)acrylic acid ester monomers, maleic anhydride, and maleimide monomers, then to continuously add the remaining 100–60% by weight of the monomer mixture at a rate smaller than the rate of formation of the polymer, and to continue the polymerization reaction until 80% or more of the polymerization transfer rate is achieved.

The bromine-containing copolymer (B) prepared according to this method incorporates bromostyrene thereinto more homogeneously than copolymers prepared by other methods, thus exhibiting superior flame retarding characteristic.

Component (C) in the flame retardant resin composition of the present invention is an antimony oxide. Specific examples are antimony trioxide, (colloidal) antimony pentaoxide, and the like, with antimony trioxide being most preferable.

An amount of component (A) in the flame retardant resin composition of the present invention is 15–99% by weight, and preferably 25–95% by weight. If the amount of component (A) is less than 15% by weight, the impact resistance is insufficient; and if greater than 99% by weight, the flame retardance is impaired.

An amount of component (B) is 0–84% by weight, preferably 1–75% by weight, more preferably 10–75% by weight. If greater than 84% by weight, the impact resistance is reduced.

Incorporation of component (B) in the above proportion brings about excellent moldability of the resin composition and produces molded products with a good outward appearance.

An amount of component (C) to be incorporated is 1–30% by weight, and preferably 5–25% by weight. If less than 1% by weight, the flame retardance is reduced; and if greater than 30% by weight, the impact resistance is insufficient.

In addition to the above requirements, the flame retardant resin composition of the present invention contains bromine atom and antimony atom at a molar ratio of 1.2–4.5:10, and preferably 1.5–2.69:1.0. A sufficient flame retardance cannot be obtained at a bromine/antimony molar ratio outside this range.

An amount of rubber-like polymer to be incorporated in the flame retardant resin composition of the present invention is preferably 5–65% by weight, and more preferably 10–40% by weight. If the amount of the rubber-like polymer less than 5% by weight, the flame retardance is reduced; and if greater than 30% by weight, the impact resistance is insufficient.

A bromine content of the flame retardant resin composition of the present invention is preferably 1–30% by weight, and more preferably 5–20% by weight. If the bromine content is smaller than 1% by weight, sufficient flame retardance is not obtained; and if greater than 30% by weight, the impact resistance is impaired.

A feature of the resin composition of the present invention is copolymerization of bromostyrene into the graft copolymer of component (A). Owing to the homogeneous distribution throughout the resin composition of bromostyrene which contributes to the provision of flame retardance to the resin, the resin composition not only has increased flame retardance, but also possesses promoted impact resistance due to improvement in the mutual solubility of component (A) and graft copolymer (B). Furthermore, because of copolymerization of bromostyrene around rubber particles (the graft portion), the resin has an excellent dripping prevention effect during combustion.

Examples of polymerization methods for components (A) and (B) of the flame retardant resin composition of the present invention which can be given include the block polymerization method, the solution polymerization method, the suspension polymerization method, the emulsion polymerization method, and the precipitation polymerization method, as well as any combinations of these methods. In addition, either a continuous, semi-continuous, or batch process is applicable. In order to ensure homogeneous copolymerization of bromostyrene into the polymer and to increase its dispersion throughout the resin, thus promoting the flame retardance, a (batch)increment method using the emulsion polymerization is preferable.

As a device for melting and mixing the various components used in the manufacture of the flame retardant resin composition of the present invention, commonly known equipment including an open type mixing roll, a closed type Banbury mixer, an extruder, a kneader, a continuous mixer, and the like can be used.

To the flame retardant resin composition of the present invention may further be incorporated, as required, one or more types of polymers selected from ABS resin, AES resin, MBS resin, polycarbonate, PPS, PPO, POM, polyamide, PBT, PET, polyvinyl chloride, polyolefin, polyacetal, epoxy resins, silicone resin, polyurethane, vinylidene fluoride, HIPS, polystyrene, and thermoplastic elastomers. A preferable amount of these polymers is 20–95% by weight for the flame retardant resin composition of the present invention. Especially incorporation of polycarbonate, PPS, PPO, polyamide, PBT, PET, polyvinyl chloride, polyacetal, epoxy resin, silicone resin, or polyurethane provides excellent flame retardance.

Furthermore, the following additives can optionally be mixed into the flame retardant resin composition of the present invention: antioxidants, stabilizers (e.g. ultraviolet absorbents), lubricants (e.g. silicone oil, low molecular weight polyethylene), fillers (e.g. calcium carbonate, talc, clay, titanium oxide, silica, magnesium carbonate, carbon black, barium sulfate, calcium oxide, aluminum oxide, mica, glass beads, glass fiber, metal fillers, and the like), other flame retardant (e.g. halogen-containing compounds, phosphorus-containing compounds, nitrogen-containing compounds, silicon-containing compounds, metal oxides or hydroxides, and the like), dispersing agents, foaming agents, colorants, and the like.

The flame retardant resin composition of the present invention can be formed into products by extrusion, injection molding, press molding, or the like. The products formed are superior in flame retardance, impact resistance, and formability in practice. Also, because they have a good external appearance, they are extremely useful as a material for household products, electrical appliances, OA equipment, automobiles, and the like, and as a construction material.

EXAMPLES

The present invention will be described in more detail by way of examples, which are given for illustration of the invention and are not intended to be limiting thereof.

EXAMPLE 1

(1) Preparation of Graft Copolymer (A-1)

Into a separable flask equipped with a reflux condenser, a thermometer, and a stirrer, 30 parts of polybutadiene rubber latex (as solid), 65 parts of ion exchanged water, 0.35 part of rosin oxide soap, 7 parts of dibromostyrene, 15 parts of styrene, and 1.5 parts of acrylonitrile were charged as initial components. A solution of 0.2 part of sodium pyrophosphate, 0.01 part of $FeSO_4 \cdot 7H_2O$, and 0.4 part of fructose dissolved in 20 parts of ion exchanged water was added to the above mixture. Then, 0.07 part of cumene hydroperoxide was added to initiate the polymerization. After one hour of polymerization, 45 parts of ion exchanged water, 0.7 part of rosin oxide soap, 13 parts of dibromostyrene, 30 parts of styrene, 3.5 parts of acrylonitrile, and 0.01 part of cumene hydroperoxide were continuously added over a period of two hours, followed by an additional one hour polymerization to complete the reaction. The copolymer latex obtained in this manner was coagulated by the addition of sulfuric acid, washed with water, and dried, to obtain a graft copolymer (A-1).

(2) Preparation of Graft Copolymer (A-2)

Into a separable flask equipped with a reflux condenser, a thermometer, and a stirrer, were charged 250 parts of ion exchanged water, 3.0 parts of potassium rodinate, 75.5 parts of styrene, 25.5 parts of acrylonitrile, and 0.1 part of t-dodecylmercaptan. A solution of 0.05 part of sodium ethylenediaminetetraacetate, 0.002 of $FeSO_4.7H_2O$, and 0.1 part of sodium formaldehyde sulfoxylate dissolved in 20 parts of ion exchanged water was added to the above mixture. Then, 0.1 part of diisopropylbenzene hydroperoxide was added to initiate the polymerization. The mixture was reacted for about one hour to complete the reaction. The copolymer latex obtained in this manner was coagulated by the addition of sulfuric acid, washed with water, and dried, to obtain a graft copolymer (A-2).

(3) Preparation of Bromine-Containing Copolymer

Into a separable flask equipped with a reflux condenser, a thermometer, and a stirrer, were charged 250 parts of ion exchanged water, 3 parts of potassium rodinate, 4 parts of dibromostyrene, 17.5 parts of styrene, 4 parts of acrylonitrile, and 0.03 part of t-dodecylmercaptan. A solution of 0.05 part of sodium ethylenediaminetetraacetate, 0.002 part of $FeSO_4.7H_2O$, and 0.1 part of sodium formaldehyde sulfoxylate dissolved in 8 parts of ion exchanged water was added to the above mixture. Then, 0.025 part of diisopropylbenzene hydroperoxide was added to initiate the polymerization. After one hour of polymerization, were further added continuously over a period of 1.5 hours 11 parts of dibromostyrene, 52.5 parts of styrene, 11 parts of acrylonitrile, 0.09 part of t-dodecylmercaptan, and a solution of 0.05 part of sodium ethylenediaminetetraacetate, 0.002 part of $FeSO_4.7H_2O$, and 0.1 part of sodium formaldehyde sulfoxylate dissolved in 8 parts of ion exchanged water, followed by an additional one hour polymerization to complete the reaction. The copolymer latex obtained in this manner was coagulated by the addition of sulfuric acid, washed with water, and dried, to obtain a bromine-containing copolymer.

(4) Preparation of a Flame Retardant Resin Composition

The above graft copolymer, the copolymer, the bromine-containing copolymer, and antimony trioxide were mixed according to the formulation shown in Table 1. The mixture was blended by a Henschel-type mixer, followed by kneading in the molten state at 220° C. with a bend-equipped extruder, and pelletized to provide a pelletized flame retardant resin composition. The evaluation results of the flame retardant resin composition thus obtained are given in Table 1.

EXAMPLES 2-5 AND COMPARATIVE EXAMPLES 1-7

The polymerization was carried out in the same manner as in Example 1, except that proportions of the rubber-like polymer, dibromostyrene, styrene, and acrylonitrile were changed. Then, flame retardant resin compositions were obtained following the same procedure as in Example 1. The resulting flame retardant resin compositions were evaluated in the same manner as in Example 1. The results are shown in Table 1.

COMPARATIVE EXAMPLE 8

A resin composition was prepared in the same manner as in Example 1, by using, instead of components (A) and (B), 68 parts of an impact resistant resin composition prepared by blending acrylonitrile-butadiene-styrene copolymer resin, JSR ABS 10 (an ABS resin manufactured by Japan Synthetic Rubber Co., Ltd.) and acrylonitrle-styrene copolymer (acrylonitrile:styrene = 75.5:24.5) in a proportion to make the rubber content 20% by weight, and 16 parts of tertrabromobisphenol A, and further adding 16 parts of antimony trioxide. The resin composition was evaluated in the same manner as in Example 1. The results are shown in Table 1.

The characteristics of the compositions were evaluated by the following methods.
(1) Izod impact value
   ASTM D256 ¼", 23° C., notched (kg·cm/cm)
(2) Combustibility test
   Conforming to UL-94
   Test leaf dimensions: 1/16"×½"×5"

TABLE 1

| | Example | | | | | Comparative Example | | | | | | | |
|---|---|---|---|---|---|---|---|---|---|---|---|---|---|
| | 1 | 2 | 3 | 4 | 5 | 1 | 2 | 3 | 4 | 5 | 6 | 7 | 8 |
| <Copolymer Composition> | | | | | | | | | | | | | |
| Component (A) | | | | | | | | | | | | | |
| (Graft Copolymer) | | | | | | | | | | | | | |
| Polybutadiene | 30 | 30 | 30 | 20 | 15 | 5 | 75 | 30 | 30 | 30 | 30 | 30 | — |
| Dibromostyrene | 20 | 26 | 25 | 27 | 30 | 26 | 20 | 4 | 55 | 25 | 20 | 2 | — |
| Styrene | 45 | 27 | 35 | 49 | 50 | 52 | 3 | 49 | 5 | 40 | 45 | 63 | — |
| Acrylonitrile | 5 | 17 | 10 | 4 | 5 | 17 | 2 | 17 | 10 | 5 | 5 | 5 | — |
| (Copolymer) | | | | | | | | | | | | | |
| Styrene | 75.5 | 75.5 | 75.5 | 75.5 | 75.5 | 75.5 | 75.5 | 75.5 | 75.5 | 75.5 | 75.5 | 75.5 | — |
| Acrylonitrile | 24.5 | 24.5 | 24.5 | 24.5 | 24.5 | 24.5 | 25.5 | 25.5 | 25.5 | 25.5 | 25.5 | 25.5 | — |
| Component (B) | | | | | | | | | | | | | |
| Dibromostyrene | 15 | 25 | 33 | — | — | 25 | 32 | 4 | 55 | 12 | 14 | 35 | — |
| Styrene | 70 | 65 | 57 | — | — | 65 | 58 | 86 | 35 | 73 | 70 | 50 | |
| Acrylonitrile | 15 | 10 | 10 | — | — | 10 | 10 | 10 | 10 | 15 | 16 | 15 | — |
| <Formulation> | | | | | | | | | | | | | |
| Component (A) | 50 | 50 | 50 | 87 | 91 | 50 | 50 | 50 | 50 | 50 | 50 | 50 | — |
| In Component (A): | | | | | | | | | | | | | |
| Graft Copolymer | 90 | 90 | 90 | 90 | 90 | 90 | 90 | 90 | 90 | 90 | 90 | 90 | — |
| Copolymer | 10 | 10 | 10 | 10 | 10 | 10 | 10 | 10 | 10 | 10 | 10 | 10 | — |

TABLE 1-continued

| | Example | | | | | Comparative Example | | | | | | | |
|---|---|---|---|---|---|---|---|---|---|---|---|---|---|
| | 1 | 2 | 3 | 4 | 5 | 1 | 2 | 3 | 4 | 5 | 6 | 7 | 8 |
| Component (B) | 41 | 37 | 41 | — | — | 37 | 37 | 48 | 25 | 34 | 47 | 41 | — |
| Component (C) ($Sb_2O_3$) | 9 | 13 | 9 | 13 | 9 | 13 | 13 | 2 | 25 | 16 | 3 | 9 | 16 |
| ABS | — | — | — | — | — | — | — | — | — | — | — | — | 68 |
| Tetrabromobisphenol A | — | — | — | — | — | — | — | — | — | — | — | — | 16 |
| Rubber Content | 13.5 | 13.5 | 13.5 | 15.7 | 12.3 | 2.3 | 33.8 | 13.5 | 13.5 | 13.5 | 13.5 | 13.5 | 13.6 |
| Bromine Content | 9.2 | 12.8 | 15.1 | 12.9 | 15.0 | 12.8 | 12.7 | 2.3 | 23.5 | 9.4 | 9.5 | 9.3 | 9.4 |
| Bromine/Antimony (molar ratio) | 1.86 | 1.80 | 3.06 | 1.81 | 3.04 | 1.80 | 1.78 | 2.10 | 1.71 | 5.78 | 1.89 | 1.86 | 1.86 |
| <Evaluation Results> | | | | | | | | | | | | | |
| Izot Impact Strength | 11 | 10 | 9 | 11 | 8 | 2 | 40 | 11 | 4 | 3 | 10 | 11 | 8 |
| Flame Retardance: UL-94 (1/16") | V-0 | V-0 | V-0 | V-0 | V-0 | V-0 | not V | not V | V-0 | not V | not V | V-2 | V-2 |

As evident from the results shown in Table 1, the compositions of Examples 1-5 exhibited excellent flame retardance and superior impact resistance.

In contrast, the compositions of Comparative Examples 1 and 2, which contained the rubber-like polymer falling outside the claimed range, exhibited either inferior impact resistance (the composition of Comparative Example 1 with a smaller amount of the rubber-like polymer) or inferior flame retardance (the composition of Comparative Example 2 with a larger amount of the rubber-like polymer).

Similarly, the compositions of Comparative Examples 3 and 4, which contained bromostyrene (component (B) of the claimed composition) falling outside the range defined in the present invention, exhibited either inferior flame retardance (the composition of Comparative Example 3 with a smaller amount of bromostyrene) or inferior impact resistance (the composition of Comparative Example 4 with a larger amount of bromostyrene).

Also, the compositions of Comparative Examples 5 and 6, which contained bromine and antimony atoms at a ratio falling outside the range defined herein, exhibited inferior characteristics; in the compositions of Comparative Example 5 with a bromine/antimony ratio smaller than that defined both the impact resistance and the flame retardance were inferior, and in the compositions of Comparative Example 6 with a bromine/antimony ratio larger than that defined the flame retardance was insufficient.

Furthermore, the composition of Comparative Example 7 containing bromostyrene in the graft copolymer in an amount smaller than that defined herein exhibited inferior flame retardance.

EFFECT OF THE INVENTION

The resin composition of the present invention possesses excellent flame retardance at a low content of bromine atom. The flame retarding agent or its decomposed products are not liberated from the composition. In addition, the composition has high impact resistance which is durable in practical use.

The resin composition of the present invention therefore can be molded into large type articles and complicated articles such as office machines, including OA equipment, electronic appliances, electrical machines, and the like. Thus, it is very useful material in the industry.

What is claimed is:

1. A flame retardant resin composition comprising the following components (A), (B) and (C) in the ratio (A):(B):(C)=15-99:0-84:1-30% by weight; and wherein the molar ratio of bromine atom and antimony atom is 1.2-4.5:1;

component (A): a rubber reinforced resin composition comprising: 10-100% by weight of graft copolymer (A-1) which is obtained by the polymerization of (b) 90-30% by weight of monomer components comprising 5-50% by weight of bromostyrene and 95-50% by weight of one or more monomers selected from the group consisting of aromatic vinyl monomers, cyanated vinyl monomers, (meth)acrylic acid ester monomers, maleic anhydride, and maleimide monomers in the presence of (a) 10-70% by weight of a rubber-like polymer [(a)+(b)=100% by weight] and 90-0% by weight of copolymer (A-2) obtained by the polymerization of 60-90% by weight of armoatic vinyl monomers and 40-10% by weight of one or more monomers selected from the group consisting of cyanated vinyl monomers, (meth)acrylic acid ester monomers, maleic anhydride, and maleimide monomers; and component (B): a bromine-containing copolymer obtained by the polymerization of 5-50% by weight of bromostyrene and 95-50% by weight of one or more monomers selected from the group consisting of aromatic vinyl monomers cyanated vinyl monomers, (meth)acrylic acid ester monomers, maleic anhydride, and maleimide monomers, and component (C): an antimony oxide.

* * * * *